(No Model.)

N. J. CLUTE.
ELECTRIC CAR BRAKE.

No. 498,624. Patented May 30, 1893.

WITNESSES
Geo. E. Freek.
Rob. A. Fitzgerald

INVENTOR
Nicholas J. Clute
per Lehmann Pattison & Nesbit
Atty's.

THE NORRIS PETERS CO., PHOTO-LITHO., WASHINGTON, D. C.

UNITED STATES PATENT OFFICE.

NICHOLAS J. CLUTE, OF SCHENECTADY, NEW YORK.

ELECTRIC CAR-BRAKE.

SPECIFICATION forming part of Letters Patent No. 498,624, dated May 30, 1893.

Application filed October 24, 1892. Serial No. 449,830. (No model.)

*To all whom it may concern:*

Be it known that I, NICHOLAS J. CLUTE, of Schenectady, in the county of Schenectady and State of New York, have invented certain new and useful Improvements in Electric Brakes; and I do hereby declare the following to be a full, clear, and exact description of the invention, such as will enable others skilled in the art to which it pertains to make and use it, reference being had to the accompanying drawings, which form part of this specification.

My invention relates to improvements in electric brakes, and it consists in the construction and arrangements of parts which will be fully described hereinafter and particularly referred to in the claims.

The primary object of my invention is to provide a solenoid electric brake constructed and arranged to have the greatest power of the mechanism exerted, when the solenoid has reached its weakest point.

A further object of my invention is to provide a solenoid for electric brakes of the particular construction hereinafter fully shown and described, and for the purposes which will also be fully set forth in connection with the description thereof.

The objects of my invention also further consist in the particular construction of the parts and their relative arrangement for producing the results to be fully specified in the specification.

Figure 1:
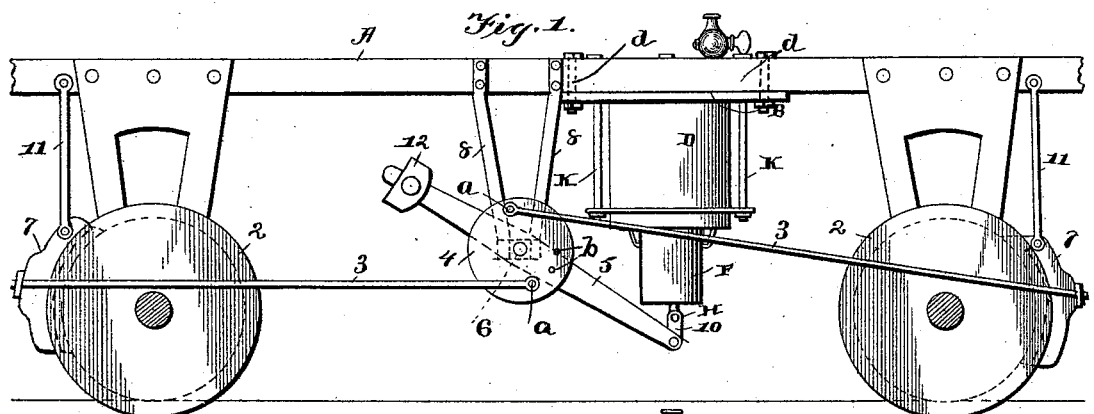
Figure 2:
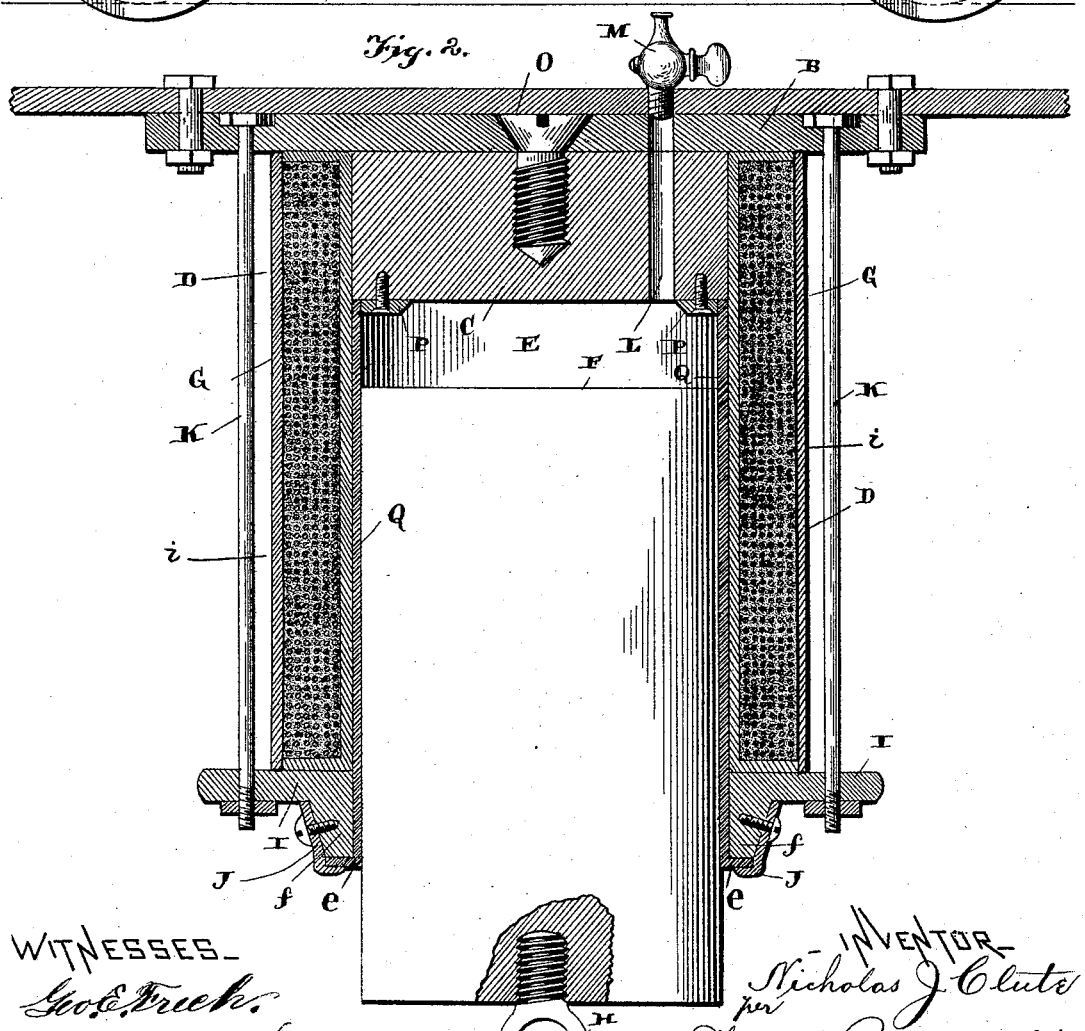

In the accompanying drawings:—Figure 1 is a side elevation of my invention complete, showing it attached to the under side of the car truck. Fig. 2 is an enlarged vertical section of the solenoid, showing its specific construction.

A represents the longitudinal portion of the car truck, and 2 the wheels thereof, both of which may be of the ordinary construction. Suspended from the truck adjacent to the wheels are the brake-shoe links 11, to the lower ends of which are attached the brake-shoes 7, in the usual manner.

Depending from the truck between the wheels 2 are the bars 8 which support a wrist pin wheel 4, and this wheel 4 is journaled in horizontally sliding bearings 6, for a purpose to be presently described. This wheel carries two wrist pins $a$ upon which the inner ends of the brake-rods 3 are pivoted, and the opposite ends of these rods are connected with the brake-shoes 7. However I do not limit myself to the idea of connecting the rods 3 to the brake-shoes as here shown, for they may be connected with the ordinary brake shoe mechanism without in any manner departing from the spirit of my invention, which does not reside particularly in this special connection.

Pivoted upon the same axle as the wheel 4 is an operating lever 5, which is adjustably connected with the wheel 4 by means of a bolt or bolts passing through the said lever and the openings $b$ of the said wheel. A link 10 connects one end of this lever with the core of the solenoid, a description of which will be particularly given farther on. Placed upon the opposite end of this lever 5 is an adjustable counter-balance weight 12 by means of which the weight of the end of the lever 5 and that of the solenoid will be to a certain extent counteracted, so that their gravity will be only sufficient to release the brakes, without any surplus weight, which would have to be overcome or lifted by the solenoid, and thus detract that much from its power in applying the brake, as will be readily understood.

Referring now to Fig. 2 which shows the specific construction of the solenoid, D is a cylinder around which the wire coils G are wound. These will be arranged in coils, so that one or more coils can be thrown in or out of the circuit by means of a switch box, thus varying the strength or magnetic power of the said coils upon the solenoid core F, which is connected by means of the eye or hook H with the link 10 of the brake mechanism, as before described. The upper end B of the cylinder D is made so as to project beyond it to permit of its being bolted to the truck of the car by means of bolts $d$, and to admit the vertical bolts K which extend downward and through the lower end I of the cylinder D, and by means of these bolts K the several parts of the stationary portion of the solenoid are held to and supported by the upper head B.

Placed in the upper end of the solenoid is a soft metal portion C, or core, which becomes magnetized when a current is passed through the coils G, thus adding very materially to the strength or magnetic force of the cylinder upon the moving core F, and at that time when the magnetic force of the cylinder D is weakest upon the core F. That is to say when the core F has passed up into the cylinder a considerable portion of its stroke, the magnetic force of the solenoid is weakened upon the core F, but at this time the magnetic force of the core C is greatest upon the core F, which it will be seen is a very desirable feature. Secured to this stationary core C is a non-magnetic strip P, which will prevent the core F from sticking to the core C, should it by accident pass up into the cylinder sufficiently far to bring it in contact with the said strip P.

Placed with the cylinder D is a brass cylinder Q which has its lower end provided with an outwardly extending flange e, which extends over the lower end of a downwardly projecting flange f, of the lower cylinder head I. Clamps or hooks J are secured to this flange I in any suitable manner, and have their hooked ends to extend over the flange e of the cylinder or bushing Q, thereby holding it in place in the cylinder. This bushing Q is thus made removable, so that as it wears it can be removed and another placed in its stead. The object of the depending flange f of the lower cylinder head I is to form a guide and support for the core when it is at its lowest point. A screw O passes through the upper head B, and into the core C for holding the latter in place in the cylinder.

Made in the upper end of the cylinder is an opening L, (preferably through the core C as here shown) and connected with this opening is a valve M. The object of this arrangement is to provide a closed cylinder, to form an air space E, which produces an air cushion to prevent the core from being suddenly forced upward and the brakes thereby suddenly applied, which is undesirable. By forming an air cushion of the cylinder, and providing an outlet, the core can be allowed to be attracted by the solenoid with more or less speed according to the size of the outlet, which in this case is regulated by means of the valve M.

Referring now to Fig. 1, I desire to describe that when the core F has reached, or nearly reached its upward movement, at which point its magnet power is weakest, the pins a upon the wheel 4 will have reached nearly the center of said wheel, whereby less power is required to rotate it than is the case when the pins a are in the position shown in said figure, as will be readily conceived. The relative position of these pins to the core F is regulated by means of the adjustment of the lever 5 upon the said wheel 4.

While I here show a lever having an adjustment independent of the wheel 4, I do not limit myself to this construction, for the reason that the lever may be rigidly connected with the wheel, and not extend beyond it to receive a counter weight, and the operation of my invention remain the same.

The object of having the wheel 4 mounted in longitudinally sliding bearings 6, is that the said wheel can move back and forth independent of its standards, so that there is no lateral strain upon the standards or supports 8, and also to cause the said wheel to accommodate itself to any variance between the lengths of the rods 3, and also to cause the brake shoes at each end of the car to be applied with equal force.

I here show and describe a wheel 4, but it will be understood that a lever can be made to serve the same purpose, the inner ends of the rods in this instance being connected to the lever at opposite sides of the said lever. In other words, the wheel 4 may be omitted and the rods 3 connected at their inner ends directly to the lever at opposite sides of its pivotal point and the same result accomplished, though I prefer to use a wheel, and a lever adjustable thereon.

Great trouble is experienced in devices of this character, for the reason that a powerful current causes the solenoid to get very hot, thus destroying it by burning the cotton insulation. I prevent this result by winding the bare uncovered copper or other wire a slight distance apart, so that a composition of plaster of paris and asbestus I can be placed between the coils or strands of wire, and also between the several layers. This produces a solenoid which is fire proof, and lasting any length of time without injury to any part of the apparatus. The coil being made fire proof in this manner, it is not affected to any damaging degree by a powerful current, as will be readily understood.

Having thus described my invention, what I claim, and desire to secure by Letters Patent, is—

1. An electric car brake comprising an oscillating wheel forming a lever, brake shoes, rods having one end connected with the brake shoes and their opposite ends connected to opposite sides of the said wheel, an arm adjustably connected to said wheel, and a solenoid core connected to the projecting end of said arm, substantially as specified.

2. An electric car brake comprising brake shoes, a lever pivoted between its ends, rods having one end connected with the brake shoes, and their opposite ends connected to the lever respectively above and below its pivotal point, a vertical solenoid adjacent to the said lever, and an arm connected to said lever and projecting with its outer end to one side of a horizontal line drawn through the pivotal point of said lever, and connected directly to the solenoid core to carry it toward the said horizontal line, whereby in operation the leverage of the arm is increased and the proportionate resistance of the rods decreased, substantially as set forth.

3. An electric car brake comprising brake shoes, a lever pivoted between its ends, rods having one end connected to the brake shoes and the opposite ends connected to the lever respectively above and below its pivotal point, an arm connected to the said lever substantially in a parallel line with the said rods, the said arm projecting to opposite sides of the pivotal point of the said lever, one end of the said arm having an adjustable counter weight, and a solenoid connected to the opposite end of the said arm, substantially as shown and described.

4. A solenoid for car brakes comprising a cylinder having an air chamber and an air outlet therefor, a core fitting closely in said cylinder, and a brake mechanism connected with said core.

5. A solenoid comprising a cylinder, a removable bushing therefor, and hooks or plates for holding the bushing in place.

6. A coil formed of bare wire with a composition of plaster of paris and asbestus between and separating the strands or coils of said coil.

In testimony whereof I affix my signature in presence of two witnesses.

NICHOLAS J. CLUTE.

Witnesses:
JACOB W. CLUTE,
GERSHOM BANKER.